United States Patent
Irie et al.

(10) Patent No.: US 6,338,916 B1
(45) Date of Patent: Jan. 15, 2002

(54) HYDROGEN ABSORBING ALLOY, METHOD OF MANUFACTURING HYDROGEN ABSORBING ALLOY AND ALKALI SECONDARY BATTERY

(75) Inventors: Shuichiro Irie, Kanagawa; Hideharu Suzuki, Takasaki; Reiji Nishikawa, Kanagawa; Kazuta Takeno, Kawasaki, all of (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/495,929

(22) Filed: Feb. 2, 2000

(30) Foreign Application Priority Data

Feb. 5, 1999 (JP) .............................. 11-028634

(51) Int. Cl.[7] .............................................. H01M 4/38
(52) U.S. Cl. ..................................... 429/218.2; 420/900
(58) Field of Search ................................ 420/900, 580, 420/441, 455; 148/442, 426, 707, 675; 429/218.2

(56) References Cited

U.S. PATENT DOCUMENTS 6,248,475 B1 * 6/2001 Hayashida et al. ...... 429/218.2

OTHER PUBLICATIONS

Shinjiro Wakao, et al., "Development of Zr–Based Hydrogen–Absorbing Alloys with Laves Phase for Battery", Journal of Advanced Science, vol. 6, No. 1, 1994, pp. 5–10.

* cited by examiner

Primary Examiner—Roy King
Assistant Examiner—Harry D. Wilkins, III
(74) Attorney, Agent, or Firm—Oblon, Spivak, McClelland, Maier & Neustadt, P.C.

(57) ABSTRACT

Provided is a hydrogen absorbing alloy superior to the $MmNi_5$ system hydrogen absorbing alloy and the TiFe system hydrogen absorbing alloy that are widely put to practical use in both the capacity density per unit volume and the capacity density per unit weight. The hydrogen absorbing alloy of the present invention is also superior to the conventional $TiMn_2$ system hydrogen absorbing alloy in the initial activation. The hydrogen absorbing alloy of the present invention is represented by a general formula $AM_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of $2.7 < x < 3.8$, and an average atomic radius r meets the relationship $1.36 \text{ Å} \leq r \leq 1.39 \text{ Å}$.

26 Claims, 1 Drawing Sheet

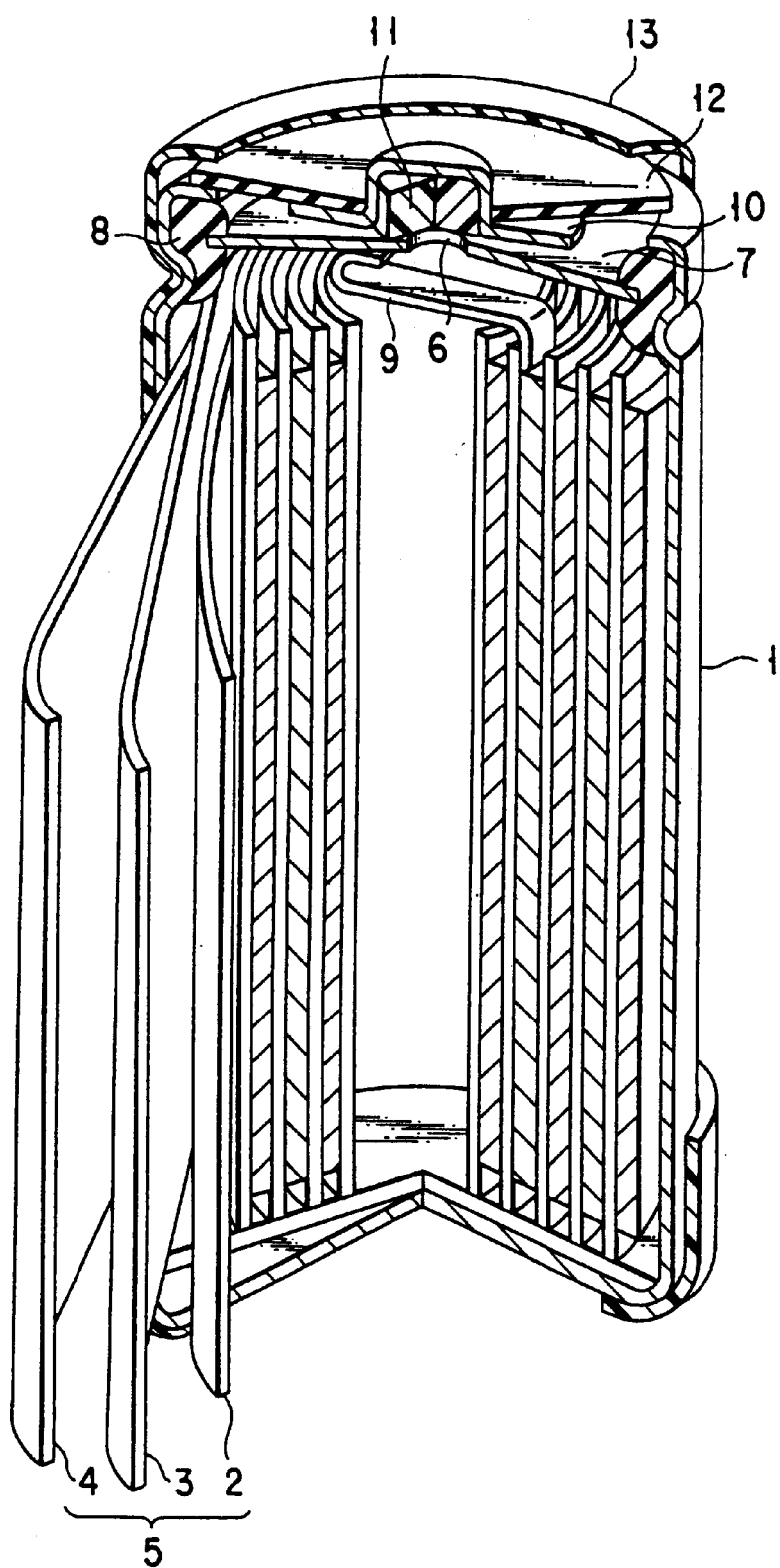
FIGURE

HYDROGEN ABSORBING ALLOY, METHOD OF MANUFACTURING HYDROGEN ABSORBING ALLOY AND ALKALI SECONDARY BATTERY

BACKGROUND OF THE INVENTION

The present invention relates to a hydrogen absorbing alloy capable of absorbing-desorbing hydrogen, a method of manufacturing the same, and an alkali secondary battery comprising a negative electrode containing a hydrogen absorbing alloy.

Known hydrogen absorbing alloys include a TiFe system having mainly a CsCl type structure, a MmNi$_5$ system (Mm representing a misch metal) having a CaCu type structure, and (Ti, Zr)(V, Mn)$_2$ system having structures of a MgZn$_2$ type, MgCu$_2$ type or a MgNi$_2$ type. Vigorous researches are being made by many researchers on the use of the TiFe system hydrogen absorbing alloy as a hydrogen storing material and on the use of the MmNi$_5$ system hydrogen absorbing alloy and the (Ti, Zr)(V, Mn)$_2$ system hydrogen absorbing alloy as a material of the negative electrode of a high capacity secondary battery.

The hydrogen storing material is applied to a heat pump and a fuel battery, and a TiFe system hydrogen absorbing alloy that permits maintaining the absorption-desorption cycle of hydrogen over a long period of time because of its excellent properties of being poisoned has been developed.

A nickel-cadmium secondary battery and a nickel-hydrogen secondary battery are known as high capacity secondary batteries. Particularly, the nickel-hydrogen secondary battery comprising a negative electrode containing a hydrogen absorbing alloy that permits absorbing-desorbing hydrogen is widely used as a small hermetic secondary battery excellent in compatibility to the environment in a power source of a portable electronic appliance.

However, in a nickel-hydrogen secondary battery comprising a negative electrode containing a hydrogen absorbing alloy of the MmNi$_5$ system (Mm: misch metal) or the TiMn$_2$ system, the hydrogen absorbing capacity of the hydrogen absorbing alloy is limited, making it difficult to further increase the hydrogen absorbing capacity.

Under the circumstances, hydrogen absorbing alloys of V-Ti system and Ti$_2$Ni system have been developed. However, these hydrogen absorbing alloys, which vigorously react directly with hydrogen under high temperatures, are poor in reactivity with hydrogen under room temperature, with the result that it is difficult to achieve an initial activation.

BRIEF SUMMARY OF THE INVENTION

An object of the present invention is to provide a hydrogen absorbing alloy having a capacity density per unit volume and a capacity density per unit weight higher than those of the MmNi$_5$ system hydrogen absorbing alloy and the TiFe system hydrogen absorbing alloy that are widely put to a practical use nowadays and exhibiting an initial activation more satisfactory than that of the TiMn$_2$ system hydrogen absorbing alloy.

Another object of the present invention is to provide a method of manufacturing a hydrogen absorbing alloy in which the above-noted properties are further improved.

A still another object of the present invention is to provide an alkali secondary battery exhibiting a high capacity, compared with the case where the secondary battery comprises a negative electrode containing the MmNi$_5$ system hydrogen absorbing alloy, and excellent in the high rate charge-discharge characteristics, compared with the case where the secondary battery comprises a negative electrode containing the TiMn$_2$ system hydrogen absorbing alloy.

According to a first aspect of the present invention, there is provided a hydrogen absorbing alloy represented by a general formula AM$_x$, where A is at least one element selected from IA group, IIA group, IIB group, and IVB group of the periodic table, and M is at least one element selected from VB group, VIB group, VIIB group, VIIIB group, IB group, IIB group, IIIA group, IVA group and VA group of the periodic table, x meets the relationship of $2.7 < x < 3.8$, and an average atomic radius r meets the relationship $1.36 \text{ Å} \leq r \leq 1.39 \text{ Å}$.

According to a second aspect of the present invention, there is provided a method of manufacturing a hydrogen absorbing alloy, wherein an alloy represented by a general formula AM$_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of $2.7 < x < 3.8$, and an average atomic radius r meets the relationship $1.36 \text{ Å} \leq r \leq 1.39 \text{ Å}$, is subjected to a heat treatment under vacuum or an inert gas atmosphere under temperatures not lower than 300° C. and lower than the melting point of said alloy.

According to a third aspect of the present invention, there is provided a hydrogen absorbing alloy represented by a general formula AM$_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of $2.7 < x < 3.8$, an average atomic radius r meets the relationship $1.36 \text{ Å} \leq r \leq 1.39 \text{ Å}$, and said x and said r meet the relationship $1.41 \leq 0.017x + r \leq 1.45$.

According to a fourth aspect of the present invention, there is provided a method of manufacturing a hydrogen absorbing alloy, wherein an alloy represented by a general formula AM$_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of $2.7 < x < 3.8$, an average atomic radius r meets the relationship $1.36 \text{ Å} \leq r \leq 1.39 \text{ Å}$, and said x and r meet the relationship $1.41 \leq 0.017x + r \leq 1.45$, is subjected to a heat treatment under vacuum or an inert gas atmosphere under temperatures not lower than 300° C. and lower than the melting point of said alloy.

According to a fifth aspect of the present invention, there is provided a hydrogen absorbing alloy represented by a general formula AM$_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of $2.7 < x < 3.8$, an average atomic radius r (Å) and an equilibrium pressure Peq (atm) during the hydrogen absorption meet the relationships $1.36 \leq r \leq 1.39$ and $0.1 \leq Peq \leq 3.5$, respectively.

According to a sixth aspect of the present invention, there is provided a method of manufacturing a hydrogen absorbing alloy, wherein an alloy represented by a general formula $AM_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of 2.7<x<3.8, an average atomic radius r (Å) and an equilibrium pressure Peq (atm) during the hydrogen absorption meet the relationships $1.36 \leq r \leq 1.39$ and $0.1 \leq Peq \leq 3.5$, respectively, is subjected to a heat treatment under vacuum or an inert gas atmosphere and under temperatures not lower than 300° C. and lower than the melting point of the alloy.

According to a seventh aspect of the present invention, there is provided an alkali secondary battery comprising a negative electrode containing a hydrogen absorbing alloy represented by a general formula $AM_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of 2.7<x<3.8, and an average atomic radius r meets the relationship $1.36 \text{ Å} \leq r \leq 1.39 \text{ Å}$.

According to an eighth aspect of the present invention, there is provided an alkali secondary battery comprising a negative electrode containing a hydrogen absorbing alloy represented by a general formula $AM_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of 2.7<x<3.8, an average atomic radius r meets the relationship $1.36 \text{ Å} \leq r \leq 1.39 \text{ Å}$, and said x and said r meet the relationship $1.41 \leq 0.017x + r \leq 1.45$.

Further, according to a ninth aspect of the present invention, there is provided an alkali secondary battery comprising a negative electrode containing a hydrogen absorbing alloy represented by a general formula $AM_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of 2.7<x<3.8, and an average atomic radius r (Å) and an equilibrium pressure Peq (atm) during the hydrogen absorption meet the relationships $1.36 \leq r \leq 1.39$ and $0.1 \leq Peq \leq 3.5$, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The accompanying single FIGURE is a perspective view, partly broken away, showing a nickel-hydrogen secondary battery as an example of an alkali secondary battery of the present invention.

DETAILED DESCRIPTION OF THE INVENTION

A hydrogen absorbing alloy of the present invention will now be described in detail.

(1) Hydrogen absorbing alloy (first embodiment)

A hydrogen absorbing alloy according to a first embodiment of the present invention is represented by a general formula (1) of $AM_x$, where A is at least one element selected from IA group (Li, Na, K, Rb, Cd), IIA group (Be, Mg, Ca, Sr, Ba), IIIB group (Sc, Y, La, Ce, Pr, Nd, Sm, Eu, Gd, Tb, Dy, Ho, Er, Tm, Yb, Lu), and IVB group (Ti, Zr, Hf) of the periodic table, and M is at least one element selected from VB group (V, Nb, Ta), VIB group (Cr, Mo, W), VIIB group (Mn, Re), VIIIB group (Fe, Co, Ni, Ru, Rh, Pd, Os, Ir, Pt), IB group (Cu, Ag, Au), IIB group (Zn, Cd, Hg), IIIA group Lb (B, Al, Ga, In, Tl), IVA group (C, Si, Ge, Sn, Pb) and VA group (N, P, As, Sb, Bi) of the periodic table, and x meets the relationship of 2.7<x<3.8. In the hydrogen absorbing alloy of the first embodiment, an average atomic radius r meets relationship (2) of $1.36 \text{ Å} \leq r \leq 1.39 \text{ Å}$.

It is desirable for the element A included in the general formula (1) to be at least one element selected from the group consisting of Li, Mg, Ca, Sr, Sc, Y, Ti, Zr, La, Ce, Pr, Nd, Sm, Er and Yb. Particularly, it is desirable for the element A included in the general formula (1) to be at least one element selected from the group consisting of La, Ce, Pr, Nd and Mg in view of the improvements in the capacity density per unit volume and in the capacity density per unit weight of the hydrogen absorbing alloy.

On the other hand, it is desirable for the element M included in the general formula (1) to be at least one element selected from the group consisting of V, Nb, Cr, Mn, Fe, Co, Ni, Pd, Cu, Ag, Zn, B, Al, Ga, In, Si, Ge, Sn, P, Sb and Bi. Particularly, it is desirable for the element M included in the general formula (1) to be at least one element selected from the group consisting of Cr. Mn, Fe, Co, Ni and Al in view of the improvements in the capacity density per unit volume and in the capacity density per unit weight of the hydrogen absorbing alloy.

A hydrogen absorbing alloy excellent in the initial hydrogen absorbing-desorbing characteristics and having a high capacity can be obtained by allowing x in general formula (1) to meet the relationship 2.7<x<3.8. If x is not larger than 2.7, the initial hydrogen absorbing-desorbing characteristics tend to be lowered. On the other hand, if x is not smaller than 3.8, the capacity of the hydrogen absorbing alloy tends to be lowered. Preferably, x in general formula (1) should meet the relationship $2.9 \leq x \leq 3.6$.

The average atomic radius r in relationship (2) give above is calculated by formula (3) given below:

$$r = (\Sigma r_i \cdot c_i)/\Sigma c_i \qquad (3)$$

where ri represents the atomic radius of an i-th constituting element and ci represents an atomic ratio of the i-th constituting element. The value of the atomic radius described in, for example, "International Tables for X-Ray Crystallography Vol. 2 (Kynoch Press, Birmingham, 1962)" can be used as the atomic radius.

If the average atomic radius r is defined to meet the relationship $1.36 \text{ Å} \leq r \leq 1.39 \text{ Å}$ as in formula (2), it is possible to obtain a hydrogen absorbing alloy excellent in the initial hydrogen absorbing-desorbing characteristics and having a high capacity. More preferably, the average atomic radius r is defined to meet the relationship 1.37 Å≦r≦1.38 Å.

How to manufacture the hydrogen absorbing alloy (1) according to the first embodiment of the present invention will now be described.

(a) An alloy of the composition defined in general formula (1) and meeting the average atomic radius given in formula (2) is subjected to a heat treatment under vacuum or an inert gas atmosphere and under temperatures not lower than 300° C. and lower than the melting point of the alloy so as to obtain a desired hydrogen absorbing alloy.

(b) An alloy of the composition defined in general formula (1) and meeting the average atomic radius given in formula (2) is subjected to an arc melting or a high frequency induction melting under vacuum or an inert gas atmosphere, followed by casting the resultant melt in a metallic mold and subsequently cooling the casting. The resultant casting is roughly pulverized, followed by applying a heat treatment to the pulverized material under vacuum or an inert gas atmosphere and under temperatures not lower than 300° C. and lower than the melting point of the alloy so as to obtain a desired hydrogen absorbing alloy.

In each of methods (a) and (b) of manufacturing a hydrogen absorbing alloy, it is desirable to carry out the heat treatment under temperatures falling within a range of between 500° C. and 1200° C., preferably between 800° C. and 1100° C. Where the heat treatment is carried out at 800 to 1100° C., it is possible to control the desired phase formation, to suppress nonuniformity in the state of the phase formation of the hydrogen absorbing alloy, and to increase the amount of the hydrogen absorption. Further, where the particular hydrogen absorbing alloy is used in a negative electrode of a secondary battery, the cycle life of the secondary battery can be improved.

It is desirable for the treating time under the temperature range noted above (preferably 800 to 1100° C.) to be 0.1 to 100 hours, preferably 0.5 to 50 hours, and more preferably 1 to 24 hours. Particularly, where the heat treatment is performed for 1 to 24 hours, the hydrogen absorption amount can be further improved and, where the hydrogen absorbing alloy is used as a negative electrode of a secondary battery, the cycle life of the secondary battery can be improved.

In method (b) of manufacturing a hydrogen absorbing alloy, a melt rapid cooling method can also be employed before the pulverizing step in addition to the arc melting method and the high frequency induction melting method.

A mechanical grinding method, a mechanical alloying method and an atomizing method can also be employed in place of the arc melting process or the high frequency induction melting process and the rough pulverizing process.

(2) Hydrogen absorbing alloy (second embodiment)

A hydrogen absorbing alloy according to a second embodiment of the present invention is represented by a general formula (1) of $AM_x$. An average atomic radius r of the element constituting the alloy of general formula (1) meets relationship (2) of 1.36 Å≦r≦1.39 Å, and x in the general formula and the average atomic radius r meet the relationship (3) of 1.41≦0.017x+r≦1.45.

It is desirable for component A in general formula (1) to be at least one element selected from Li, Ce, Pr, Nd, Sm, Eu and Yb. Particularly, it is desirable for component A in general formula (1) to be at least one element selected from La, Ce, Pr, Nd and Mg in order to obtain a hydrogen absorbing alloy excellent in both the capacity density per volume and the capacity density per weight.

It is desirable for component M in general formula (1) to be at least one element selected from V, Nb, Cr. Mn, Fe, Co, Ni, Pd. Cu, Ag, Zn, B, Al, Ga, In, Si, Ge, Sn, P, Sb and Bi. Particularly, it is desirable for component M in general formula (1) to be at least one element selected from Cr, Mn, Co, Ni and Al in order to obtain a hydrogen absorbing alloy excellent in both the capacity density per volume and the capacity density per weight. The reason for definition of x in general formula (1) is as already described in conjunction with hydrogen absorbing alloy (1) of the first embodiment.

The average atomic radius r, given in formula (2), of the elements constituting the alloy of general formula (1) is calculated by formula (5) given previously in conjunction with the hydrogen absorbing alloy (1) of the first embodiment. The reason for defining the average atomic radius r as in formula (2) is as already described in conjunction with the hydrogen absorbing alloy (1) of the first embodiment. More preferably, the average atomic radius r is defined to meet the relationship 1.37 Å≦r≦1.38 Å.

Where the relationship between x in general formula (1) and r is defined to meet relationship (3) of 1.41≦0.017x+r≦1.45, the reactivity with hydrogen under room temperature is improved, making it possible to obtain a hydrogen absorbing alloy satisfactory in the initial activation. Therefore, where the particular hydrogen absorbing alloy is used as a negative electrode, it is possible to obtain an alkali secondary battery exhibiting a long cycle life. Preferably, x and r should meet the relationship 1.42≦0.017x+r≦1.44.

How to manufacture the hydrogen absorbing alloy (2) of the second embodiment will now be described.

(a) An alloy of the composition defined in general formula (1), meeting the average atomic radius r given in formula (2), and meeting the relationship (3) between x in general formula (1) and the average atomic radius r is subjected to a heat treatment under vacuum or an inert gas atmosphere and under temperatures not lower than 300° C. and lower than the melting point of the alloy so as to obtain a desired hydrogen absorbing alloy.

(b) An alloy of the composition defined in general formula (1), meeting the average atomic radius r given in formula (2) and meeting the relationship (3) between x in general formula (1) and the average atomic radius r is subjected to an arc melting or a high frequency induction melting under vacuum or an inert gas atmosphere, followed by casting the resultant melt in a metallic mold and subsequently cooling the casting. The resultant casting is roughly pulverized, followed by applying a heat treatment to the pulverized material under vacuum or an inert gas atmosphere and under temperatures not lower than 300° C. and lower than the melting point of the alloy so as to obtain a desired hydrogen absorbing alloy.

In each of methods (a) and (b) of manufacturing a hydrogen absorbing alloy, it is desirable to carry out the heat treatment under temperatures falling within a range of between 500° C. and 1200° C., preferably between 800° C. and 1100° C. Where the heat treatment is carried out at 800 to 1100° C., it is possible to control the desired phase formation, to suppress nonuniformity in the state of the phase formation of the hydrogen absorbing alloy, and to increase the amount of the hydrogen absorption. Further, where the particular hydrogen absorbing alloy is used in a negative electrode of a secondary battery, the cycle life of the secondary battery can be improved.

It is desirable for the heat treatment under the temperature range noted above, preferably between 800° C. and 1100° C., to be performed for 0.1 to 100 hours, preferably for 0.5 to 50 hours, and more preferably for 1 to 24 hours. Particularly, where the heat treatment is performed for 1 to 24 hours, the amount of hydrogen absorption can be further increased. Where the resultant hydrogen absorbing alloy is used in a negative electrode of a secondary battery, the cycle life of the battery can be improved.

In method (b) of manufacturing a hydrogen absorbing alloy, a melt rapid cooling method can be employed in addition to the arc melting method and the high frequency induction melting method before the rough pulverization step. It is also possible to employ a mechanical grinding method, a mechanical alloying method or an atomizing method in place of the arc melting process or the high frequency induction melting process and the rough pulverization process.

(3) Hydrogen absorbing alloy (third embodiment)

A hydrogen absorbing alloy according to a third embodiment of the present invention is represented by general formula (1) of $AM_x$ referred to previously. In the third embodiment of the present invention, the average atomic radius r referred to previously meets the relationship (2) of $1.36\ \text{Å} \leq r \leq 1.39\ \text{Å}$. Also, an equilibrium pressure Peq (atm) in the hydrogen absorbing step meets relationship (4) of $0.1 \leq Peq \leq 3.5$.

It is desirable for component A included in the general formula (1) to be at least one element selected from the group consisting of Li, Mg, Ca, Sr, Sc, Y, Ti, Zr, La, Ce, Pr, Nd, Sm, Er and Yb. Particularly, it is desirable for component A to be at least one element selected from the group consisting of La, Ce, Pr, Nd and Mg in view of the improvements in the capacity density per unit volume and in the capacity density per unit weight of the hydrogen absorbing alloy.

On the other hand, it is desirable for the element M included in the general formula (1) to be at least one element selected from the group consisting of V, Nb, Cr, Mn, Fe, Co, Ni, Pd, Cu, Ag, Zn, B, Al, Ga, In, Si, Ge, Sn, P, Sb and Bi. Particularly, it is desirable for the element M included in the general formula (1) to be at least one element selected from the group consisting of Cr, Mn, Fe, Co, Ni and Al in view of the improvements in the capacity density per unit volume and in the capacity density per unit weight of the hydrogen absorbing alloy.

The reason for defining x in general formula (1) is as already described in conjunction with the hydrogen absorbing alloy (1) according to the first embodiment of the present invention. More preferably, x in general formula (1) should meet the relationship $2.9 \leq x \leq 3.6$.

The average atomic radius (r) in formula (2) is calculated by formula (5) described previously in conjunction with the hydrogen absorbing alloy (1) according to the first embodiment of the present invention. The reason for defining the average atomic radius r to meet formula (2) is as already described in conjunction with the hydrogen absorbing alloy (1) according to the first embodiment of the present invention. More preferably, the average atomic radius r should meet the relationship $1.37\ \text{Å} \leq r \leq 1.38\ \text{Å}$.

By defining the equilibrium pressure Peq to meet formula (4) of $0.1\ \text{atm.} \leq Peq \leq 3.5\ \text{atm.}$, the reactivity with hydrogen under room temperature is improved so as to obtain a hydrogen absorbing alloy having a good initial activation. Therefore, where the particular hydrogen absorbing alloy is used in a negative electrode of an alkali secondary battery, a battery having a long cycle life can be obtained. If the equilibrium pressure Peq is lower than 0.1 atm., it is difficult to desorb hydrogen under low temperatures. On the other hand, if the equilibrium pressure Peq exceeds 3.5 atm., the hydrogen absorption is rendered difficult. Therefore, in an alkali secondary battery comprising a negative electrode containing the particular hydrogen absorbing alloy, it is necessary to carry out trial charge-discharge cycles many times in the initial stage of the battery operation. More preferably, the equilibrium pressure Peq (atm) should meet the relationship $0.5 \leq Peq < 2.0$.

How to manufacture the hydrogen absorbing alloy (3) of the third embodiment will now be described.

(a) An alloy of the composition defined in general formula (1), meeting the average atomic radius r given in formula (2), and meeting the equilibrium pressure Peq given in formula (4) is subjected to a heat treatment under vacuum or an inert gas atmosphere and under temperatures not lower than 300° C. and lower than the melting point of the alloy so as to obtain a desired hydrogen absorbing alloy.

(b) An alloy of the composition defined in general formula (1), meeting the average atomic radius r given in formula (2) and meeting the equilibrium pressure Peq given in formula (4) is subjected to an arc melting or a high frequency induction melting under vacuum or an inert gas atmosphere, followed by casting the resultant melt in a metallic mold and subsequently cooling the casting. The resultant casting is roughly pulverized, followed by applying a heat treatment to the pulverized material under vacuum or an inert gas atmosphere and under temperatures not lower than 300° C. and lower than the melting point of the alloy so as to obtain a desired hydrogen absorbing alloy.

In each of methods (a) and (b) of manufacturing a hydrogen absorbing alloy, it is desirable to carry out the heat treatment under temperatures falling within a range of between 500° C. and 1200° C., preferably between 800° C. and 1100° C. Particularly, where the heat treatment is carried out at 800 to 1100° C., it is possible to control the desired phase formation, to suppress nonuniformity in the state of the phase formation of the hydrogen absorbing alloy, and to increase the amount of the hydrogen absorption. Further, where the particular hydrogen absorbing alloy is used in a negative electrode of a secondary battery, the cycle life of the secondary battery can be improved.

It is desirable for the heat treatment under the temperature range noted above, preferably between 800° C. and 1100° C., to be performed for 0.1 to 100 hours, preferably for 0.5 to 50 hours, and more preferably for 1 to 24 hours. Particularly, where the heat treatment is performed for 1 to 24 hours, the amount of hydrogen absorption can be further increased. Where the resultant hydrogen absorbing alloy is used in a negative electrode of a secondary battery, the cycle life of the battery can be improved.

In method (b) of manufacturing a hydrogen absorbing alloy, a melt rapid cooling method can be employed in addition to the arc melting method and the high frequency induction melting method before the rough pulverization step. It is also possible to employ a mechanical grinding method, a mechanical alloying method or an atomizing method in place of the arc melting process or the high frequency induction melting process and the rough pulverization process.

An alkali secondary battery, e.g., a cylindrical alkali secondary battery, of the present invention will now be described with reference to the accompanying FIGURE.

As shown in the FIGURE, an electrode group 5 prepared by spirally winding a laminate structure consisting of a positive electrode 2, a separator 3 and a negative electrode 4 is housed in a cylindrical container 1 having a bottom. The negative electrode 4 is arranged at the outermost circumference of the electrode group 5 so as to be electrically connected to the container 1. Further, an alkali electrolyte is housed within the container 1.

A circular sealing plate 7 having a hole 6 in the center is arranged in an upper open portion of the container 1. A ring-like insulating gasket 8 is arranged between the circumferential periphery of the sealing plate 7 and the inner surface in an upper open portion of the container 1. The sealing plate 7 is hermetically fixed to the container 1 with the gasket 8 interposed therebetween by a caulking treatment that permits the upper open portion of the container 1 to be shrunk inward. A positive electrode lead wire 9 is connected at one end to the positive electrode 2 and at the other end to the lower surface of the sealing plate 7. Further, a cap-shaped positive electrode terminal 10 is mounted to an upper surface of the sealing plate 7 in a manner to cover the hole 6.

A safety valve 11 made of rubber is arranged within the free space surrounded by the sealing plate 7 and the positive electrode terminal 10 in a manner to close the hole 6. A circular holding plate 12 having a hole in the center and made of an insulating material is arranged on the positive electrode terminal 10 such that a projection of the positive electrode terminal 10 protrudes upward through the hole of the holding plate 12. Further, a jacket tube 13 covers the circumferential periphery of the holding plate 12, the side surface of the container 1 and the circumferential surface at the bottom portion of the container 1.

The positive electrode 2, the negative electrode 4, the separator 3 and the electrolyte will now be described in detail.

1) Positive electrode 2:

The positive electrode 2 contains a nickel compound as an active material. The nickel compound used in the present invention includes, for example, nickel hydroxide, nickel hydroxide having zinc and cobalt coprecipitated thereon, and nickel oxide. Particularly, it is desirable to use nickel hydroxide having zinc and cobalt coprecipitated thereon.

The positive electrode (paste type positive electrode) is manufactured by, for example, kneading an active material of a nickel compound, a conductive material and a binder together with water to prepare a paste, followed by loading the paste in a conductive core and subsequently drying and pressure-molding the resultant structure.

At least one material selected from the group consisting of, for example, a cobalt compound and a metal cobalt is used as the conductive material. The cobalt compound includes, for example, cobalt hydroxide [$Co(OH)_2$] and cobalt monoxide (CoO). Particularly, it is desirable to use cobalt hydroxide, cobalt monoxide or a mixture thereof as the conductive material.

The binder used in the present invention includes, for example, hydrophobic polymers such as polytetrafluoroethylene, polyethylene, and polypropylene; cellulose-based materials such as carboxymethyl cellulose, methyl cellulose and hydroxypropyl methyl cellulose; acrylic acid esters such as sodium polyacrylate; hydrophilic polymers such as polyvinyl alcohol and polyethyleneoxide; and rubber-based polymers such as latex.

Further, the conductive core used in the present invention includes, for example, a mesh-like, sponge-like, fibrous or felt-like porous metallic material made of nickel, stainless steel or a metal plated with nickel.

2) Negative electrode 4:

The negative electrode 4 contains a powder of any of hydrogen absorbing alloys (1) to (3) described previously. The negative electrode (paste type positive electrode) is manufactured by, for example, kneading a powder of any of hydrogen absorbing alloys (1) to (3), a conductive material and a binder together with water to prepare a paste, followed by loading the paste in a conductive core and subsequently drying and pressure-molding, as required, the resultant structure.

The binder similar to that used in manufacturing the positive electrode can also be used for manufacturing the negative electrode 4. It is desirable to add the binder in an amount of 0.5 to 6 parts by weight relative to 100 parts by weight of the powder of hydrogen absorbing alloy.

As the conductive material, it is possible to use, for example, carbon blacks such as acetylene black, "Ketchen black" (trade name of a carbon black manufactured by Lion Aguzo Inc.) and furnace black. It is also possible to use graphite or the like as the conductive material. It is desirable to add at most 5 parts by weight of the conductive material relative to 100 parts by weight of the powder of the hydrogen absorbing alloy.

The conductive core used for manufacturing the negative electrode 4 includes, for example, a two dimensional structure such as a punched metal, an expanded metal, a punched steel plate or a metal net and a three dimensional structure such as a foamed metal and a mesh-like sintered metal fiber.

3) Separator 3:

The separator 3 used in the present invention includes, for example, an unwoven fabric of olefin fibers such as an unwoven fabric of polyethylene fiber, an unwoven fabric of ethylene-vinyl alcohol copolymer fiber, and an unwoven fabric of polypropylene fiber; an unwoven fabric of an olefin fiber such as an unwoven fabric of polypropylene fiber imparted with a hydrophilic function group; and an unwoven fabric of polyamide fiber such as nylon 6, 6. The hydrophilic functional group can be imparted to the unwoven fabric of olefin fiber by, for example, a corona discharge treatment, a sulfonation treatment, a graft copolymerization, and coating of a surfactant or a hydrophilic resin.

4) Alkali electrolyte:

The alkali electrolyte used in the present invention includes, for example, a mixed solution consisting of sodium hydroxide (NaOH) and lithium hydroxide (LiOH), a mixed solution consisting of potassium hydroxide (KOH) and LiOH, and a mixed solution consisting of KOH, LiOH and NaOH.

The hydrogen absorbing alloy of the present invention described above is represented by a general formula $AM_x$, where A is at least one element selected from IA group, IIA group, IIIB group, and IVB group of the periodic table, and M is at least one element selected from VB group, VIB group, VIIB group, VIIIB group, IB group, IIB group, IIIA group, IVA group and VA group of the periodic table, x meets the relationship of $2.7 < x < 3.8$, and an average atomic radius r meets the relationship $1.36 \text{ Å} \leq r \leq 1.39 \text{ Å}$. The hydrogen absorbing alloy of the particular construction permits reversibly increasing the amount of the hydrogen absorption and also permits improving both the capacity density per unit volume and the capacity density per unit weight, compared with the $MmNi_5$ system hydrogen absorbing alloy or the TiFe system hydrogen absorbing alloy that are widely put to a practical use nowadays. Further, the hydrogen absorbing alloy of the present invention permits improving the initial activation, compared with the conventional $TiMn_2$ system hydrogen absorbing alloy.

The hydrogen absorbing alloy of the present invention can be manufactured by subjecting an alloy having a composition represented by general formula (1) and having an average atomic radius specified in the present invention to a heat treatment under temperatures not lower than 300° C. and lower than the melting point of the alloy. The particular heat treatment makes it possible to control formation of the desired phase, to suppress nonuniformity in the state of the phase formation of the hydrogen absorbing alloy, and to further increase the amount of the hydrogen absorption. Where the hydrogen absorbing alloy of the present invention is used as a negative electrode material of a secondary battery, the cycle life of the secondary battery can be improved.

The hydrogen absorbing alloy (2) according to the second embodiment of the present invention has a composition similar to that of the hydrogen absorbing alloy (1) according to the first embodiment of the present invention, has an average atomic radius r meeting the relationship 1.36 Å$\leq$r$\leq$1.39 Å, and meets the relationship 1.41$\leq$0.017x+ r$\leq$1.45 between x in general formula (1) and the average atomic radium r. The hydrogen absorbing alloy of the particular construction permits reversibly increasing the amount of the hydrogen absorption and also permits improving both the capacity density per unit volume and the capacity density per unit weight, compared with the MmNi$_5$ system hydrogen absorbing alloy or the TiFe system hydrogen absorbing alloy that are widely put to a practical use nowadays. Further, the hydrogen absorbing alloy of the present invention permits improving the initial activation, compared with the conventional TiMn$_2$ system hydrogen absorbing alloy.

The hydrogen absorbing alloy of the present invention can also be manufactured by subjecting an alloy, which has a composition represented by general formula (1), has an average atomic radius specified in the present invention, and meets the particular relationship between x included in general formula (1) and the average atomic radius r, to a heat treatment under temperatures not lower than 300° C. and lower than the melting point of the alloy. The particular heat treatment makes it possible to control formation of the desired phase, to suppress nonuniformity in the state of the phase formation of the hydrogen absorbing alloy, and to further increase the amount of the hydrogen absorption. Where the hydrogen absorbing alloy of the present invention is used as a negative electrode material of a secondary battery, the cycle life of the secondary battery can be improved.

The hydrogen absorbing alloy (3) according to the third embodiment of the present invention has a composition similar to that of the hydrogen absorbing alloy (1) according to the first embodiment of the present invention, has an average atomic radius r meeting the relationship 1.36 Å$\leq$r$\leq$1.39 Å, and has an equilibrium pressure Peq during the hydrogen absorption meeting the relationship 0.1$\leq$Peq$\leq$3.5. The hydrogen absorbing alloy of the particular construction permits reversibly increasing the amount of the hydrogen absorption and also permits improving both the capacity density per unit volume and the capacity density per unit weight, compared with the MmNi$_5$ system hydrogen absorbing alloy or the TiFe system hydrogen absorbing alloy that are widely put to a practical use nowadays. Further, the hydrogen absorbing alloy of the present invention permits improving the initial activation, compared with the conventional TiMn$_2$ system hydrogen absorbing alloy.

The hydrogen absorbing alloy of the present invention can also be manufactured by subjecting an alloy, which has a composition represented by general formula (1), has an average atomic radius specified in the present invention, and has a predetermined equilibrium pressure during the hydrogen absorption, to a heat treatment under temperatures not lower than 300° C. and lower than the melting point of the alloy. The particular heat treatment makes it possible to control formation of the desired phase, to suppress nonuniformity in the state of the phase formation of the hydrogen absorbing alloy, and to further increase the amount of the hydrogen absorption. Where the hydrogen absorbing alloy of the present invention is used as a negative electrode material of a secondary battery, the cycle life of the secondary battery can be improved.

The alkali secondary battery of the present invention comprises a negative electrode containing any of hydrogen absorbing alloys (1) to (3) and, thus, has a high capacity, compared with a secondary battery comprising a negative electrode containing the MmNi$_5$ system hydrogen absorbing alloy, and also has excellent high rate charge-discharge characteristics, compared with a secondary battery comprising a negative electrode containing the TiMn$_2$ system hydrogen absorbing alloy.

Preferred Examples of the present invention will now be described in detail with reference to the accompanying FIGURE.

EXAMPLES 1–3 AND COMPARATIVE EXAMPLES 1–4

<Preparation of hydrogen absorbing alloy>

Alloy compositions shown in Table 1 were melted under an argon gas atmosphere by using an arc melting furnace, followed by cooling the melt to obtain ingots. These ingots were subjected to a heat treatment at 900° C. for 10 hours under an argon gas atmosphere so as to homogenize the ingots, thereby obtaining 7 kinds of hydrogen absorbing alloy ingots having an average atomic radius as shown in Table 2.

Each of the hydrogen absorbing alloy ingots thus prepared was put in a pressure-resistant container so as to obtain a pressure-composition isothermic curve by Ziebelt method and, thus, to measure the hydrogen absorbing amount at 0.01 to 10 atm (H/M: a ratio of the number of hydrogen atoms to unit amount of the alloy). Table 2 shows the results.

<Preparation of paste type negative electrode>

Each of the hydrogen absorbing alloy ingots noted above was pulverized under an inert gas atmosphere to prepare a powdery alloy, followed by passing the powdery alloy through a sieve of 75 μm. Then, 1 part by weight of polytetrafluoroethylene, 0.2 part by weight of polyacrylic acid and 0.1 part by weight of carboxymethyl cellulose (CMC) were added to 100 parts by weight of the powdery hydrogen absorbing alloy, followed by further adding 1 part by weight of carbon black and 50 parts by weight of water to the resultant mixture for kneading the mixture, thereby preparing 7 kinds of pastes. Each of these pastes was loaded in a foamed nickel having a porosity of 95%, followed by drying at 125° C. and, then, press molding to prepare a sheet having a thickness of 0.3 mm. Further, the sheet was cut into small pieces each having a width of 60 mm and a length of 168 mm so as to prepare 7 kinds of paste-type negative electrodes.

<Preparation of paste-type positive electrode>

A paste was prepared by kneading a mixture obtained by adding 1 part by weight of polytetrafluoroethylene, 0.2 part by weight of carboxymethyl cellulose, and 60 parts by weight of pure water to a mixed powder consisting 90 parts by weight of a nickel hydroxide powder and 10 parts by weight of a cobalt monoxide powder. The paste thus prepared was loaded in a foamed nickel, followed by drying and, then, press molding so as to prepare a paste type positive electrode having a width of 60 mm, a length of 135 mm and a thickness of 0.75 mm.

In the next step, an electrode group was prepared by spirally winding a laminate structure consisting of the negative electrode, the positive electrode and the separator interposed between the positive and negative electrodes. The electrode group thus prepared was housed in a cylindrical container having a bottom, followed by pouring an electrolyte consisting of an aqueous solution of potassium hydroxide having a specific gravity of 1.31 into the cylindrical container and subsequently sealing the opening so as to assemble 7 kinds of a cylindrical nickel-hydrogen secondary battery of 4/3A size (capacity of 4200 mAh), which was constructed as shown in the accompanying FIGURE.

The battery life was examined for each of the secondary batteries prepared in Examples 1–3 and Comparative Examples 1–4 by repeating a cycle test such that the battery was charged for 13 hours under a temperature of 25° C. and a time rate of 10, followed by discharging the battery under a temperature of 25° C. and a time rate of 5 until the battery voltage was lowered to 1.0V. The battery life was determined by the number of cycles at the time when the battery capacity was lowered to 80% of the initial capacity. Table 2 also shows the results.

Tables 1 and 2 also support clearly that the secondary battery in each of Examples 1–3, which included a negative electrode containing hydrogen absorbing alloy having a composition of $AM_x$ (2.7<x<3.8) and having an average atomic radius r of 1.36 Å≦r≦1.39 Å, exhibits a battery life markedly longer than that of the secondary battery in each of Comparative Examples 1–4 which included a negative electrode containing hydrogen absorbing alloy, in which x for $AM_x$ and the average atomic radius r fail to fall within the ranges specified in the present invention.

EXAMPLES 4–8

Five kinds of hydrogen absorbing alloys were prepared as in Example 2, except that the ingot was subjected to a heat treatment under an argon gas atmosphere for 10 hours at 750° C., 800° C., 900° C., 1100° C. and 1200° C., respectively.

The hydrogen absorption amount (H/M: ratio of the number of hydrogen atoms to unit amount of the alloy) was measured for each of the hydrogen absorbing alloy ingots thus prepared as in Examples 1–3. Table 3 shows the results.

Also, a negative electrode was prepared by using each of the hydrogen absorbing alloys, followed by assembling 5 kinds of cylindrical nickel-hydrogen secondary batteries of 4/3A size, each having a capacity of 4200 mAh, constructed as shown in the accompanying FIGURE, as in Examples 1–3. The battery life of the secondary battery for each of Examples 4–8 was examined as in Examples 1–3. Table 3 also shows the results.

TABLE 1

| | Alloy composition |
|---|---|
| Comparative Example 1 | $La_{0.41}Ce_{0.02}Pr_{0.04}Nd_{0.13}Mg_{0.40}Ni_{2.55}Cr_{0.05}$ |
| Comparative Example 2 | $La_{0.71}Nd_{0.01}Mg_{0.28}Ni_{2.40}Co_{0.30}Mn_{0.05}Al_{0.05}$ |
| Example 1 | $La_{0.52}Ce_{0.03}Pr_{0.02}Nd_{0.05}Sm_{0.04}Y_{0.03}Mg_{0.32}Ni_{2.35}Co_{0.20}Al_{0.05}P_{0.02}Fe_{0.03}Cu_{0.03}Zn_{0.02}$ |
| Example 2 | $La_{0.33}Ce_{0.03}Pr_{0.09}Nd_{0.26}Yb_{0.01}Mg_{0.28}Ni_{2.70}Co_{0.45}Cr_{0.05}Mn_{0.07}Al_{0.03}$ |
| Example 3 | $La_{0.49}Ce_{0.03}Pr_{0.05}Nd_{0.14}Mg_{0.34}Ni_{3.10}Co_{0.50}Ga_{0.02}B_{0.02}V_{0.02}Mn_{0.01}Sn_{0.03}Sb_{0.05}Bi_{0.05}$ |
| Comparative Example 3 | $La_{0.25}Ce_{0.03}Pr_{0.08}Nd_{0.22}Li_{0.01}Ca_{0.02}Ti_{0.01}Mg_{0.38}Ni_{2.90}Co_{0.60}Cr_{0.10}P_{0.03}Pd_{0.02}Nb_{0.03}Mo_{0.02}$ |
| Comparative Example 4 | $La_{0.62}Ce_{0.03}Pr_{0.02}Nd_{0.06}Yb_{0.02}Sr_{0.02}Zr_{0.01}Mg_{0.23}Ni_{3.20}Co_{0.40}Mn_{0.07}Al_{0.03}Si_{0.02}Fe_{0.16}Ag_{0.02}In_{0.02}$ |

TABLE 2

| | AM ratio x | Average atomic radius r [Å] | Hydrogen absorption amount H/M | Battery life [the number of cycles] |
|---|---|---|---|---|
| Comparative Example 1 | 2.6 | 1.386 | 0.79 | 56 |
| Comparative Example 2 | 2.8 | 1.395 | 0.81 | 77 |
| Example 1 | 2.7 | 1.389 | 0.91 | 105 |
| Example 2 | 3.3 | 1.373 | 0.99 | 112 |
| Example 3 | 3.8 | 1.360 | 0.93 | 104 |
| Comparative Example 3 | 3.7 | 1.354 | 0.82 | 81 |
| Comparative Example 4 | 3.9 | 1.365 | 0.80 | 75 |

As apparent from Tables 1 and 2, the hydrogen absorbing alloy having a composition of $AM_x$ (2.7<x<3.8) and having an average atomic radius r of 1.36 Å≦r≦1.39 Å, which was used in Examples 1–3, absorbs hydrogen in an amount larger than that absorbed by the hydrogen absorbing alloy used in Comparative Examples 1–4, in which x for $AM_x$ and the average atomic radius r fail to fall within the ranges specified in the present invention.

TABLE 3

| | Alloy composition | Heat treating temperature [° C.] | AM ratio x | Average atomic radius r [Å] | Hydrogen absorption amount H/M | Battery life [the number of cycles] |
|---|---|---|---|---|---|---|
| Example 4 | equal to Example 2 in Table 1 | 750 | 3.3 | 1.373 | 0.83 | 85 |
| Example 5 | equal to Example 2 in Table 1 | 800 | 3.3 | 1.373 | 0.90 | 91 |
| Example 6 | equal to Example 2 in Table 1 | 900 | 3.3 | 1.373 | 0.99 | 112 |
| Example 7 | equal to Example 2 in Table 1 | 1100 | 3.3 | 1.373 | 0.88 | 89 |
| Example 8 | equal to Example 2 in Table 1 | 1200 | 3.3 | 1.373 | 0.83 | 84 |

As apparent from Table 3, the hydrogen absorbing alloy obtained in each of Examples 5–7 by subjecting an ingot having a composition of $AM_x$ (2.7<x<3.8) and having an average atomic radius r of 1.36 Å≦r≦1.39 Å, to a heat treatment at 800 to 1100° C. was found to absorb hydrogen in an amount larger than that absorbed by the hydrogen absorbing alloy in each of Examples 4 and 8 obtained by applying a heat treatment to the ingot at temperatures failing to fall within the range noted above.

Table 3 also supports clearly that the secondary battery in each of Examples 5–7, which included a negative electrode containing hydrogen absorbing alloy prepared by applying a heat treatment to an ingot having a composition of $AM_x$ (2.7<x<3.8) and having an average atomic radius r of 1.36 Å≦r≦1.39 Å at 800° C. to 1100° C., exhibits a battery life markedly longer than that of the secondary battery in each of Examples 4 and 8 which included a negative electrode containing hydrogen absorbing alloy prepared by applying a heat treatment to a similar ingot at temperatures failing to fall within the range noted above.

EXAMPLES 9–13

Five kinds of hydrogen absorbing alloys were prepared as in Example 2, except that the ingot was subjected to a heat treatment under an argon gas atmosphere at 900° C. for 0.5 hour, 1 hour, 10 hours, 24 hours and 25 hours, respectively.

The hydrogen absorption amount (H/M: ratio of the number of hydrogen atoms to unit amount of the alloy) was measured for each of the hydrogen absorbing alloy ingots thus prepared as in Examples 1–3. Table 4 shows the results.

Also, a negative electrode was prepared by using each of the hydrogen absorbing alloys, followed by assembling 5 kinds of cylindrical nickel-hydrogen secondary batteries of 4/3A size, each having a capacity of 4200 mAh, constructed as shown in the accompanying FIGURE, as in Examples 1–3. The battery life of the secondary battery for each of Examples 9–13 was examined as in Examples 1–3. Table 4 also shows the results.

TABLE 4

| | Alloy composition | Heat treating time [Hr] | AM ratio x | Average atomic radius r [Å] | Hydrogen absorption amount H/M | Battery life [the number of cycles] |
|---|---|---|---|---|---|---|
| Example 9 | equal to Example 2 in Table 1 | 0.5 | 3.3 | 1.373 | 0.94 | 92 |
| Example 10 | equal to Example 2 in Table 1 | 1 | 3.3 | 1.373 | 0.98 | 100 |
| Example 11 | equal to Example 2 in Table 1 | 10 | 3.3 | 1.373 | 0.99 | 112 |
| Example 12 | equal to Example 2 in Table 1 | 24 | 3.3 | 1.373 | 0.98 | 101 |
| Example 13 | equal to Example 2 in Table 1 | 25 | 3.3 | 1.373 | 0.95 | 97 |

As apparent from Table 4, the hydrogen absorbing alloy obtained in each of Examples 10–12 by subjecting an ingot having a composition of $AM_x$ (2.7<x<3.8) and having an average atomic radius r of 1.36 Å≦r≦1.39 Å, to a heat treatment at 900° C. for 1 to 24 hours was found to absorb hydrogen in an amount larger than that absorbed by the hydrogen absorbing alloy in each of Examples 9 and 13 obtained by applying a heat treatment to the ingot at 900° C. for the time failing to fall within the range noted above.

Table 4 also supports clearly that the secondary battery in each of Examples 10–12, which included a negative electrode containing hydrogen absorbing alloy prepared by applying a heat treatment to an ingot having a composition of $AM_x$ (2.7<x<3.8) and having an average atomic radius r of 1.36 Å≦r≦1.39 Å at 900° C. for 1 to 24 hours, exhibits a battery life markedly longer than that of the secondary battery in each of Examples 9 and 13 which included a negative electrode containing hydrogen absorbing alloy prepared by applying a heat treatment to a similar ingot at 900° C. for the time failing to fall within the range noted above.

EXAMPLES 14–19 AND COMPARATIVE EXAMPLES 5–10

<Preparation of hydrogen absorbing alloy>

Alloy compositions shown in Table 5 were melted under an argon gas atmosphere by using an arc melting furnace, followed by cooling the melt to obtain ingots. These ingots were subjected to a heat treatment at 900° C. for 10 hours for the homogenizing purpose so as to obtain 9 kinds of hydrogen absorbing alloy ingots having an average atomic radius r (Å) and f(x, r)[0.017x+r] shown in Table 6.

The hydrogen absorption amount (H/M: ratio of the number of hydrogen atoms to unit amount of the alloy) was measured for each of the hydrogen absorbing alloy ingots thus prepared as in Examples 1–3. Table 6 also shows the results.

<Preparation of paste type negative electrode>

Each of the hydrogen absorbing alloy ingots noted above was pulverized under an inert gas atmosphere to prepare a powdery alloy, followed by passing the powdery alloy through a sieve of 75 μm. Then, 1 part by weight of polytetrafluoroethylene, 0.2 part by weight of polyacrylic acid and 0.1 part by weight of carboxymethyl cellulose (CMC) were added to 100 parts by weight of the powdery hydrogen absorbing alloy, followed by further adding 1 part by weight of carbon black and 50 parts by weight of water to the resultant mixture for kneading the mixture, thereby preparing 9 kinds of pastes. Each of these pastes was loaded in a foamed nickel having a porosity of 95%, followed by drying at 125° C. and, then, press molding to prepare a sheet having a thickness of 0.3 mm. Further, the sheet was cut into small pieces each having a width of 60 mm and a length of 168 mm so as to prepare 9 kinds of paste-type negative electrodes.

In the next step, an electrode group was prepared by spirally winding a laminate structure consisting of the positive electrode as in Examples 1–3, the negative electrode, and an unwoven fabric of polypropylene interposed therebetween. Then, the electrode group thus prepared was loaded in a cylindrical container having a bottom, followed by pouring an aqueous solution of potassium hydroxide having a specific gravity of 1.31 into the container, followed by sealing the opening of the container, thereby obtaining 9 kinds of cylindrical nickel-hydrogen secondary batteries of 4/3A size each having a capacity of 4200 mAh and constructed as shown in the accompanying FIGURE.

The battery life was measured for each of the secondary batteries obtained in Examples 14–16 and Comparative Examples 5–10 by a method similar to that employed in Examples 1–3. Table 6 also shows the results.

TABLE 5

| | Alloy composition |
|---|---|
| Example 5 | $La_{0.41}Ce_{0.02}Pr_{0.04}Nd_{0.13}Mg_{0.40}Ni_{2.55}Cr_{0.05}$ |
| Example 6 | $La_{0.71}Nd_{0.01}Mg_{0.28}Ni_{2.40}Co_{0.30}Mn_{0.05}Al_{0.05}$ |
| Comparative Example 7 | $La_{0.20}Ce_{0.01}Pr_{0.02}Nd_{0.06}Mg_{0.70}Ni_{2.40}Co_{0.20}Mn_{0.05}Fe_{0.05}$ |
| Example 14 | $La_{0.52}Ce_{0.03}Pr_{0.02}Nd_{0.05}Sm_{0.04}Y_{0.03}Mg_{0.32}Ni_{2.35}Co_{0.20}Al_{0.05}P_{0.02}Fe_{0.03}Cu_{0.03}Zn_{0.02}$ |
| Example 15 | $La_{0.33}Ce_{0.03}Pr_{0.09}Nd_{0.26}Yb_{0.01}Mg_{0.28}Ni_{2.70}Co_{0.45}Cr_{0.05}Mn_{0.07}Al_{0.03}$ |
| Example 16 | $La_{0.49}Ce_{0.03}Pr_{0.05}Nd_{0.14}Mg_{0.34}Ni_{3.10}Co_{0.50}Ga_{0.02}B_{0.02}V_{0.02}Mn_{0.01}Sn_{0.03}Sb_{0.05}Bi_{0.05}$ |
| Comparative Example 8 | $La_{0.25}Ce_{0.03}Pr_{0.08}Nd_{0.22}Li_{0.01}Ca_{0.02}Ti_{0.01}Mg_{0.38}Ni_{2.90}Co_{0.60}Cr_{0.10}P_{0.03}Pd_{0.02}Nb_{0.03}Mo_{0.02}$ |
| Comparative Example 9 | $La_{0.62}Ce_{0.03}Pr_{0.02}Nd_{0.06}Yb_{0.02}Sr_{0.02}Zr_{0.01}Mg_{0.23}Ni_{3.20}Co_{0.40}Mn_{0.07}Al_{0.03}Si_{0.02}Fe_{0.16}Ag_{0.02}In_{0.02}$ |
| Comparative Example 10 | $La_{0.17}Ce_{0.01}Pr_{0.04}Nd_{0.13}Yb_{0.30}Ca_{0.10}Sr_{0.05}Mg_{0.20}Ni_{3.16}Co_{0.20}Mn_{0.15}Al_{0.10}Zn_{0.03}Sn_{0.05}Bi_{0.03}In_{0.03}$ |

TABLE 6

| | AM ratio x | Average atomic radius r [Å] | f (x, r) 0.017x + r | Hydrogen absorption amount H/M | Battery life [the number of cycles] |
|---|---|---|---|---|---|
| Comparative Example 5 | 2.6 | 1.386 | 1.430 | 0.79 | 56 |
| Comparative Example 6 | 2.8 | 1.395 | 1.443 | 0.81 | 77 |
| Comparative Example 7 | 2.8 | 1.361 | 1.409 | 0.83 | 45 |
| Example 14 | 2.7 | 1.389 | 1.435 | 0.91 | 105 |
| Example 15 | 3.3 | 1.373 | 1.429 | 0.99 | 112 |
| Example 16 | 3.8 | 1.360 | 1.425 | 0.93 | 104 |
| Comparative Example 8 | 3.7 | 1.354 | 1.417 | 0.82 | 81 |
| Comparative Example 9 | 3.9 | 1.365 | 1.431 | 0.80 | 75 |
| Comparative Example 10 | 3.75 | 1.388 | 1.452 | 0.57 | 59 |

As apparent from Tables 5 and 6, the hydrogen absorbing alloy used in each of Examples 14–16, the alloy having a composition of $AM_x$ (2.7<x<3.8), an average atomic radius r of 1.36 Å≦r≦1.39 Å, and f(x, r) meeting the relationship 1.41≦0.017x+r≦1.45 was found to absorb hydrogen in an amount larger than that absorbed by the hydrogen absorbing alloy used in each of Comparative Examples 5 to 10, said alloy having x included in the general formula $AM_x$, an average atomic radius r, and f(x, r) failing to fall within the ranges noted above.

Tables 5 and 6 also support that the secondary battery in each of Examples 14–16 including a negative electrode containing the hydrogen absorbing alloy having a composition of $AM_x$ (2.7<x<3.8), an average atomic radius r of 1.36 Å≦r≦1.39 Å, and f(x, r) meeting the relationship 1.41≦0.017x+r≦1.45 was found to exhibit the battery life markedly longer than that of the secondary battery in each of Comparative Examples 5 to 10, said secondary battery including a negative electrode containing the hydrogen absorbing alloy having x included in the general formula $AM_x$, an average atomic radius r, and f(x, r) failing to fall within the ranges noted above.

EXAMPLES 17–21

Five kinds of hydrogen absorbing alloys were prepared as in Example 15, except that the ingot was subjected to a heat treatment under an argon gas atmosphere for 10 hours at 750° C., 800° C., 900° C., 1100° C. and 1200° C., respectively.

The hydrogen absorption amount (H/M: ratio of the number of hydrogen atoms to unit amount of the alloy) was measured for each of the hydrogen absorbing alloy ingots thus prepared as in Examples 1–3. Table 7 shows the results.

Also, a negative electrode was prepared by using each of the hydrogen absorbing alloys, followed by assembling 5 kinds of cylindrical nickel-hydrogen secondary batteries of 4/3A size, each having a capacity of 4200 mAh and constructed as shown in the accompanying FIGURE, as in Examples 1–3. The battery life of the secondary battery for each of Examples 17–21 was examined as in Example 1. Table 7 also shows the results.

TABLE 7

| | Alloy composition | Heat treating temperature [° C.] | AM ratio x | Average atomic radius r [Å] | f(x, r) 0.017x + r | Hydrogen absorption amount H/M | Battery life [the number of cycles] |
|---|---|---|---|---|---|---|---|
| Example 17 | equal to Example 15 in Table 5 | 750 | 3.3 | 1.373 | 1.429 | 0.83 | 85 |
| Example 18 | equal to Example 15 in Table 5 | 800 | 3.3 | 1.373 | 1.429 | 0.90 | 91 |
| Example 19 | equal to Example 15 in Table 5 | 900 | 3.3 | 1.373 | 1.429 | 0.99 | 112 |
| Example 20 | equal to Example 15 in Table 5 | 1100 | 3.3 | 1.373 | 1.429 | 0.88 | 89 |

TABLE 7-continued

| | Alloy composition | Heat treating temperature [° C.] | AM ratio x | Average atomic radius r [Å] | f(x, r) 0.017x + r | Hydrogen absorption amount H/M | Battery life [the number of cycles] |
|---|---|---|---|---|---|---|---|
| Example 21 | equal to Example 15 in Table 5 | 1200 | 3.3 | 1.373 | 1.429 | 0.83 | 84 |

As apparent from Table 7, the hydrogen absorbing alloy obtained in each of Examples 18–20 by subjecting an ingot having a composition of $AM_x$ (2.7<x<3.8), an average atomic radius r of 1.36 Å≦r≦1.39 Å, and f(x, r) meeting the relationship 1.41≦0.017x+r≦1.45, to a heat treatment at 800 to 1100° C. was found to absorb hydrogen in an amount larger than that absorbed by the hydrogen absorbing alloy in each of Examples 17 and 21 obtained by applying a heat treatment to the ingot at temperatures failing to fall within the range noted above.

Table 7 also supports clearly that the secondary battery in each of Examples 18–20, which included a negative electrode containing hydrogen absorbing alloy prepared by applying a heat treatment to an ingot having a composition of $AM_x$ (2.7<x<3.8), having an average atomic radius r of 1.36 Å≦r≦1.39 Å, and f(x, r) meeting the relationship 1.41≦0.017x+r≦1.45, at 800° C. to 1100° C., exhibits a battery life markedly longer than that of the secondary battery in each of Examples 17 and 21 which included a negative electrode containing hydrogen absorbing alloy prepared by applying a heat treatment to a similar ingot at temperatures failing to fall within the range noted above.

EXAMPLES 22–26

Five kinds of hydrogen absorbing alloys were prepared as in Example 15, except that the ingot was subjected to a heat treatment under an argon gas atmosphere at 900° C. for 0.5 hour, 1 hour, 10 hours, 24 hours and 25 hours, respectively.

The hydrogen absorption amount (H/M: ratio of the number of hydrogen atoms to unit amount of the alloy) was measured for each of the hydrogen absorbing alloy ingots thus prepared as in Examples 1–3. Table 8 shows the results.

Also, a negative electrode was prepared by using each of the hydrogen absorbing alloys, followed by assembling 5 kinds of cylindrical nickel-hydrogen secondary batteries of 4/3A size, each having a capacity of 4200 mAh and constructed as shown in the accompanying FIGURE, as in Examples 1–3. The battery life of the secondary battery for each of Examples 22–26 was examined as in Examples 1–3. Table 8 also shows the results.

TABLE 8

| | Alloy composition | Heat treating time [Hr] | AM ratio x | Average atomic radius r [Å] | f(x, r) 0.017x + r | Hydrogen absorption amount H/M | Battery life [the number of cycles] |
|---|---|---|---|---|---|---|---|
| Example 22 | equal to Example 15 in Table 5 | 0.5 | 3.3 | 1.373 | 1.429 | 0.94 | 92 |
| Example 23 | equal to Example 15 in Table 5 | 1 | 3.3 | 1.373 | 1.429 | 0.98 | 100 |
| Example 24 | equal to Example 15 in Table 5 | 10 | 3.3 | 1.373 | 1.429 | 0.99 | 112 |
| Example 25 | equal to Example 15 in Table 5 | 24 | 3.3 | 1.373 | 1.429 | 0.98 | 101 |
| Example 26 | equal to Example 15 in Table 5 | 25 | 3.3 | 1.373 | 1.429 | 0.95 | 97 |

As apparent from Table 8, the hydrogen absorbing alloy obtained in each of Examples 23–25 by subjecting an ingot having a composition of $AM_x$ (2.7<x<3.8), an average atomic radius r of 1.36 Å≦r≦1.39 Å and f(x, r) meeting the relationship 1.41≦0.017x+r≦1.45, to a heat treatment at 900° C. for 1 to 24 hours was found to absorb hydrogen in an amount larger than that absorbed by the hydrogen absorbing alloy in each of Examples 22 and 26 obtained by applying a heat treatment to the ingot at 900° C. for the time failing to fall within the range noted above.

Table 8 also supports clearly that the secondary battery in each of Examples 23–25, which included a negative electrode containing hydrogen absorbing alloy prepared by applying a heat treatment to an ingot having a composition of $AM_x$ (2.7<x<3.8), an average atomic radius r of 1.36 Å≦r≦1.39 Å and f(x, r) meeting the relationship 1.41≦0.017x+r≦1.45, at 900° C. for 1 to 24 hours, exhibits a battery life markedly longer than that of the secondary battery in each of Examples 22 and 26 which included a negative electrode containing hydrogen absorbing alloy prepared by applying a heat treatment to a similar ingot at 900° C. for the time failing to fall within the range noted above.

EXAMPLES 27–28 AND COMPARATIVE EXAMPLES 11–16

<Preparation of hydrogen absorbing alloy>

Alloy compositions shown in Table 9 were melted under an argon gas atmosphere by using an arc melting furnace, followed by cooling the melt to obtain ingots. These ingots were subjected to a heat treatment at 900° C. for 10 hours for the homogenizing purpose so as to obtain 9 kinds of hydrogen absorbing alloy ingots having an average atomic radius r (Å) and equilibrium pressure shown in Table 10.

For determining the equilibrium pressure, each of the hydrogen absorbing alloy ingots thus prepared was put in a pressure-resistant container so as to obtain a pressure-composition isothermic curve by Ziebelt method and, thus, to measure the hydrogen absorbing amount at 0.01 to 10 atm (H/M: a ratio of the number of hydrogen atoms to unit amount of the alloy). The equilibrium pressure under 0.5 H/M is given in Table 10 as the hydrogen equilibrium pressure.

Further, absorption-desorption of hydrogen for each of the hydrogen absorbing alloy ingots was repeated within a pressure-resistant container by a method similar to that described previously so as to obtain a maximum amount of the hydrogen absorption amount. Then, the number of repetitions of absorption-desorption of hydrogen until the maximum amount was reached, i.e., the number of shakedown operations, was obtained as shown in Table 10.

<Preparation of paste type negative electrode>

Each of the hydrogen absorbing alloy ingots noted above was pulverized under an inert gas atmosphere to prepare a powdery alloy, followed by passing the powdery alloy through a sieve of 75 $\mu$m. Then, 1 part by weight of polytetrafluoroethylene, 0.2 part by weight of polyacrylic acid and 0.1 part by weight of carboxymethyl cellulose (CMC) were added to 100 parts by weight of the powdery hydrogen absorbing alloy, followed by further adding 1 part by weight of carbon Ad black and 50 parts by weight of water to the resultant mixture for kneading the mixture, thereby preparing 9 kinds of pastes. Each of these pastes was loaded in a foamed nickel having a porosity of 95%, followed by drying at 125° C. and, then, press molding to prepare a sheet having a thickness of 0.3 mm. Further, the sheet was cut into small pieces each having a width of 60 mm and a length of 168 mm so as to prepare 9 kinds of paste-type negative electrodes.

In the next step, an electrode group was prepared by spirally winding a laminate structure consisting of the positive electrode as in Examples 1–3, the negative electrode, and an unwoven fabric of polypropylene interposed therebetween. Then, the electrode group thus prepared was loaded in a cylindrical container having a bottom, followed by pouring an aqueous solution of potassium hydroxide having a specific gravity of 1.31 into the container, followed by sealing the opening of the container, thereby obtaining 9 kinds of cylindrical nickel-hydrogen secondary batteries of 4/3A size each having a capacity of 4200 mAh and constructed as shown in the accompanying FIGURE.

The initial capacity and the battery life were examined for each of the secondary batteries prepared in Examples 27–29 and Comparative Examples 11–16 by repeating a cycle test such that the battery was charged for 13 hours under a temperature of 25° C. and a time rate of 10, followed by discharging the battery under a temperature of 25° C. and a time rate of 5 until the battery voltage was lowered to 1.0V. The initial capacity was determined from the discharge capacity for the first cycle. On the other hand, the battery life was determined by the number of cycles at the time when the battery capacity was lowered to 80% of the initial capacity. Table 10 also shows the results.

TABLE 9

| | Alloy composition |
|---|---|
| Comparative Example 11 | $La_{0.41}Ce_{0.02}Pr_{0.04}Nd_{0.13}Mg_{0.40}Ni_{2.55}Cr_{0.05}$ |
| Comparative Example 12 | $La_{0.71}Nd_{0.01}Mg_{0.28}Ni_{2.40}Co_{0.30}Mn_{0.05}Al_{0.05}$ |
| Comparative Example 13 | $La_{0.20}Ce_{0.01}Pr_{0.02}Nd_{0.06}Mg_{0.70}Ni_{2.40}Co_{0.20}Mn_{0.05}Fe_{0.05}$ |
| Example 27 | $La_{0.52}Ce_{0.03}Pr_{0.02}Nd_{0.05}Sm_{0.04}Y_{0.03}Mg_{0.32}Ni_{2.35}Co_{0.20}Al_{0.05}P_{0.02}Fe_{0.03}Cu_{0.03}Zn_{0.02}$ |
| Example 28 | $La_{0.33}Ce_{0.03}Pr_{0.09}Nd_{0.26}Yb_{0.01}Mg_{0.28}Ni_{2.70}Co_{0.45}Cr_{0.05}Mn_{0.07}Al_{0.03}$ |
| Example 29 | $La_{0.49}Ce_{0.03}Pr_{0.05}Nd_{0.14}Mg_{0.34}Ni_{3.10}Co_{0.50}Ga_{0.02}B_{0.02}V_{0.02}Mn_{0.01}Sn_{0.03}Sb_{0.05}Bi_{0.05}$ |
| Comparative Example 14 | $La_{0.25}Ce_{0.03}Pr_{0.08}Nd_{0.22}Li_{0.01}Ca_{0.02}Ti_{0.01}Mg_{0.38}Ni_{2.90}Co_{0.60}Cr_{0.10}P_{0.03}Pd_{0.02}Nb_{0.03}Mo_{0.02}$ |
| Comparative Example 15 | $La_{0.62}Ce_{0.03}Pr_{0.02}Nd_{0.06}Yb_{0.02}Sr_{0.02}Zr_{0.01}Mg_{0.23}Ni_{3.20}Co_{0.40}Mn_{0.07}Al_{0.03}Si_{0.02}Fe_{0.16}Ag_{0.02}In_{0.02}$ |
| Comparative Example 16 | $La_{0.17}Ce_{0.01}Pr_{0.04}Nd_{0.13}Yb_{0.30}Ca_{0.10}Sr_{0.05}Mg_{0.20}Ni_{3.16}Co_{0.20}Mn_{0.15}Al_{0.10}Zn_{0.03}Sn_{0.05}Bi_{0.03}In_{0.03}$ |

TABLE 10

| | AM ratio x | Average atomic radius r [Å] | Hydrogen equilibrium pressure Peq[atm] | Hydrogen absorption amount H/M | The number of shakedown operations | Initial capacity [mAh] | Battery life [the number of cycles] |
|---|---|---|---|---|---|---|---|
| Comparative Example 11 | 2.6 | 1.386 | 0.30 | 0.79 | 4 | 3860 | 56 |
| Comparative Example 12 | 2.8 | 1.395 | 0.40 | 0.81 | 5 | 3880 | 77 |

TABLE 10-continued

|  | AM ratio x | Average atomic radius r [Å] | Hydrogen equilibrium pressure Peq[atm] | Hydrogen absorption amount H/M | The number of shakedown operations | Initial capacity [mAh] | Battery life [the number of cycles] |
|---|---|---|---|---|---|---|---|
| Comparative Example 13 | 2.8 | 1.361 | 3.70 | 0.83 | 10 | 3310 | 45 |
| Example 27 | 2.7 | 1.389 | 0.20 | 0.91 | 2 | 4180 | 105 |
| Example 28 | 3.3 | 1.373 | 1.50 | 0.99 | 2 | 4220 | 112 |
| Example 29 | 3.8 | 1.360 | 3.40 | 0.93 | 3 | 4190 | 104 |
| Comparative Example 14 | 3.7 | 1.354 | 3.30 | 0.82 | 5 | 3790 | 81 |
| Comparative Example 15 | 3.9 | 1.365 | 3.40 | 0.80 | 4 | 3800 | 75 |
| Comparative Example 16 | 3.75 | 1.388 | 0.08 | 0.57 | 12 | 3410 | 59 |

As apparent from Tables 9 and 10, the hydrogen absorbing alloy used in each of Examples 27–29, said alloy having a composition of $AM_x$ (2.7<x<3.8), an average atomic radius r of 1.36 Å$\leq$r$\leq$1.39 Å, and an equilibrium pressure Peq (atm) meeting the relationship 0.1$\leq$Peq$\leq$3.5 was found to absorb hydrogen in an amount larger than that absorbed by the hydrogen absorbing alloy used in each of Comparative Examples 11 to 16, said alloy having x included in the general formula $AM_x$, an average atomic radius r, and an equilibrium pressure Peq failing to fall within the ranges noted above.

Tables 9 and 10 also support that the secondary battery in each of Examples 27–29 including a negative electrode containing the hydrogen absorbing alloy having a composition of $AM_x$ (2.7<x<3.8), an average atomic radius r of 1.36 Å$\leq$r$\leq$1.39 Å, and an equilibrium pressure meeting the relationship 0.1$\leq$Peq$\leq$3.5 was found to exhibit the battery life markedly longer than that of the secondary battery in each of Comparative Examples 11 to 16, said secondary battery including a negative electrode containing the hydrogen absorbing alloy having x included in the general formula $AM_x$, an average atomic radius r, and an equilibrium pressure failing to fall within the ranges noted above.

EXAMPLES 30–34

Five kinds of hydrogen absorbing alloys were prepared as in Example 28, except that the ingot was subjected to a heat treatment under an argon gas atmosphere for 10 hours at 750° C., 800° C., 900° C., 1100° C. and 1200° C., respectively.

The hydrogen absorption amount (H/M: ratio of the number of hydrogen atoms to unit amount of the alloy) and the number of shakedown operations were measured for each of the hydrogen absorbing alloy ingots thus prepared as in Examples 27–29. Table 11 shows the results.

Also, a negative electrode was prepared by using each of the hydrogen absorbing alloys, followed by assembling 5 kinds of cylindrical nickel-hydrogen secondary batteries of 4/3A size, each having a capacity of 4200 mAh and constructed as shown in the accompanying FIGURE, as in Examples 1–3.

The initial capacity and the battery life of the secondary battery for each of Examples 30–34 were examined as in Examples 27 to 29. Table 11 also shows the results.

TABLE 11

|  | Alloy composition | Heat treating temperature [° C.] | AM ratio x | Average atomic radius r [Å] | Hydrogen equilibrium pressure Peq[atm] | Hydrogen absorption amount H/M | The number of shakedown operations | Initial capacity [mAh] | Battery life [the number of cycles] |
|---|---|---|---|---|---|---|---|---|---|
| Example 30 | equal to Example 28 in Table 9 | 750 | 3.3 | 1.373 | 1.50 | 0.83 | 4 | 3950 | 85 |
| Example 31 | equal to Example 28 in Table 9 | 800 | 3.3 | 1.373 | 1.50 | 0.90 | 3 | 4070 | 91 |
| Example 32 | equal to Example 28 in Table 9 | 900 | 3.3 | 1.373 | 1.50 | 0.99 | 2 | 4220 | 112 |
| Example 33 | equal to Example 28 in Table 9 | 1100 | 3.3 | 1.373 | 1.50 | 0.88 | 3 | 4050 | 89 |
| Example 34 | equal to Example 28 in Table 9 | 1200 | 3.3 | 1.373 | 1.50 | 0.83 | 4 | 4040 | 84 |

As apparent from Table 11, the hydrogen absorbing alloy obtained in each of Examples 31–33 by subjecting an ingot having a composition of $AM_x$ (2.7<x<3.8), an average atomic radius r of 1.36 Å$\leq$r$\leq$1.39 Å, and an equilibrium pressure Peq meeting the relationship 0.1$\leq$Peq$\leq$3.5, to a heat treatment at 800 to 1100° C. was found to absorb hydrogen in an amount larger than that absorbed by the hydrogen absorbing alloy in each of Examples 30 and 34 obtained by applying a heat treatment to the ingot at temperatures failing to fall within the range noted above.

Table 11 also supports clearly that the secondary battery in each of Examples 31–33, which included a negative electrode containing hydrogen absorbing alloy prepared by applying a heat treatment to an ingot having a composition of $AM_x$ (2.7<x<3.8), having an average atomic radius r of 1.36 Å≦r≦1.39 Å, and a equilibrium pressure Peq meeting the relationship 0.1≦Peq≦3.5, at 800° C. to 1100° C., exhibits a battery life markedly longer than that of the secondary battery in each of Examples 30 and 34 which included a negative electrode containing hydrogen absorbing alloy prepared by applying a heat treatment to a similar ingot at temperatures failing to fall within the range noted above.

EXAMPLES 35–39

Five kinds of hydrogen absorbing alloys were prepared as in Example 28, except that the ingot was subjected to a heat treatment under an argon gas atmosphere at 900° C. for 0.5 hour, 1 hour, 10 hours, 24 hours and 25 hours, respectively.

The hydrogen absorption amount (H/M: ratio of the number of hydrogen atoms to unit amount of the alloy) and the number of shakedown operations were measured for each of the hydrogen absorbing alloy ingots thus prepared as in Examples 27–29. Table 12 shows the results.

Also, a negative electrode was prepared by using each of the hydrogen absorbing alloys, followed by assembling 5 kinds of cylindrical nickel-hydrogen secondary batteries of 4/3A size, each having a capacity of 4200 mAh and constructed as shown in the accompanying FIGURE, as in Examples 1–3. The initial capacity and the battery life of the secondary battery for each of Examples 35–39 were examined as in Examples 27–29. Table 12 also shows the results.

Table 12 also supports clearly that the secondary battery in each of Examples 36–38, which included a negative electrode containing hydrogen absorbing alloy prepared by applying a heat treatment to an ingot having a composition of $AM_x$ (2.7<x<3.8), an average atomic radius r of 1.36 Å≦r≦1.39 Å and an equilibrium pressure Peq (atm) meeting the relationship 0.1≦Peq≦3.5, at 900° C. for 1 to 24 hours, exhibits a battery life markedly longer than that of the secondary battery in each of Examples 35 and 39 which included a negative electrode containing the hydrogen absorbing alloy prepared by applying a heat treatment to a similar ingot at 900° C. for the time failing to fall within the range noted above.

It should be noted that an alkali secondary battery exhibiting excellent characteristics similar to those exhibited by the alkali secondary batteries prepared in Examples 1–39 can be obtained even in the case of using a hydrogen absorbing alloy other than those used in Examples 1–39 as far as the hydrogen absorbing alloy can be presented by general formula (1) given previously.

Also, each of the Examples described above is directed to a cylindrical nickel-hydrogen secondary battery in view of the process for preparing the electrode group. However, the technical idea of the present invention can also be applied to a nickel-hydrogen secondary battery having a rectangular cross section, though it is necessary to prepare the electrode group housed in the container by winding in a rectangular shape a laminate structure consisting of the positive electrode, the negative electrode, and the separator interposed between the positive and negative electrodes.

As described above, the present invention provides a hydrogen absorbing alloy superior to the $MmNi_5$ system hydrogen absorbing alloy and the TiFe system hydrogen absorbing alloy that are widely put to practical use in both the capacity density per unit volume and the capacity density

TABLE 12

| | Alloy composition | Heat treating time [Hr] | AM ratio x | Average atomic radius r [Å] | Hydrogen equilibrium pressure Peq[atm] | Hydrogen absorption amount H/M | The number of shakedown operations | Initial capacity [mAh] | Battery life [the number of cycles] |
|---|---|---|---|---|---|---|---|---|---|
| Example 35 | equal to Example 28 in Table 9 | 0.5 | 3.3 | 1.373 | 1.50 | 0.94 | 3 | 4120 | 92 |
| Example 36 | equal to Example 28 in Table 9 | 1.0 | 3.3 | 1.373 | 1.50 | 0.98 | 3 | 4150 | 100 |
| Example 37 | equal to Example 28 in Table 9 | 10 | 3.3 | 1.373 | 1.50 | 0.99 | 2 | 4220 | 112 |
| Example 38 | equal to Example 28 in Table 9 | 24 | 3.3 | 1.373 | 1.50 | 0.98 | 3 | 4170 | 101 |
| Example 39 | equal to Example 28 in Table 9 | 25 | 3.3 | 1.373 | 1.50 | 0.95 | 3 | 4140 | 97 |

As apparent from Table 12, the hydrogen absorbing alloy obtained in each of Examples 36–38 by subjecting an ingot having a composition of $AM_x$ (2.7<x<3.8), an average atomic radius r of 1.36 Å≦r≦1.39 Å and an equilibrium pressure Peq (atm) meeting the relationship 0.1≦Peq≦3.5, to a heat treatment at 900° C. for 1 to 24 hours was found to absorb hydrogen in an amount larger than that absorbed by the hydrogen absorbing alloy in each of Examples 35 and 39 obtained by applying a heat treatment to the ingot at 900° C. for the time failing to fall within the range noted above.

per unit weight. The hydrogen absorbing alloy of the present invention is also superior to the conventional $TiMn_2$ system hydrogen absorbing alloy in the initial activation.

The present invention also provides a method of manufacturing a hydrogen absorbing alloy exhibiting further improved characteristics in respect of the capacity density per unit volume, the capacity density per unit weight, and the initial activation.

Further, the present invention provides an alkali secondary battery superior in capacity to the alkali secondary battery including a negative electrode containing the conventional MmNi$_5$ system hydrogen absorbing alloy and superior in the charge-discharge characteristics at a high rate to the alkali secondary battery including a negative electrode containing the conventional TiMn$_2$ system hydrogen absorbing alloy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrogen absorbing alloy represented by a general formula AM$_x$, where A is at least one element selected from IA group, IIA group, IIIB group, or IVB group of the periodic table, and M is at least one element selected from VB group, VIB group, VIIB group, VIIIB group, IB-group, IIB group, IIIA group, IVA group or VA group of the periodic table, x meets the relationship of 2.7<x<3.8, and an average atomic radius r meets the relationship 1.36 Å$\leq$r$\leq$1.39 Å.

2. The hydrogen absorbing alloy according to claim 1, wherein "A" in the general formula AM$_x$ represents at least one element selected from the group consisting of Li, Mg, Ca, Sr, Sc, Y, Ti, Zr, La, Ce, Pr, Nd, Sm, Er and Yb.

3. The hydrogen absorbing alloy according to claim 1, wherein "M" in the general formula AM$_x$ represents at least one element selected from the group consisting of V, Nb, Cr, Mn, Fe, Co, Ni, Pd, Cu, Ag, Zn, B, Al, Ga, In, Si, Ge, Sn, P, Sb, and Bi.

4. The hydrogen absorbing alloy according to claim 1, wherein "x" in the general formula AM$_x$ meets the relationship 2.9$\leq$x$\leq$3.6.

5. The hydrogen absorbing alloy according to claim 1, wherein said average atomic radius r meets the relationship 1.37 Å$\leq$r$\leq$1.38 Å.

6. A method of manufacturing a hydrogen absorbing alloy, wherein an alloy represented by a general formula AM$_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of 2.7<x<3.8, and an average atomic radius r meets the relationship 1.36 Å$\leq$r$\leq$1.39 Å, is subjected to a heat treatment under vacuum or an inert gas atmosphere under temperatures not lower than 300° C. and lower than the melting point of said alloy.

7. The method of manufacturing a hydrogen absorbing alloy according to claim 6, wherein said heat treatment is performed at 800° C. to 1100° C.

8. A hydrogen absorbing alloy represented by a general formula AM$_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of 2.7<x<3.8, an average atomic radius r meets the relationship 1.36 Å$\leq$r$\leq$1.39 Å, and said x and said r meet the relationship 1.41$\leq$0.017x+r$\leq$1.45.

9. The hydrogen absorbing alloy according to claim 8, wherein "A" in the general formula AM$_x$ represents at least one element selected from the group consisting of Li, Mg, Ca, Sr, Sc, Y, Ti, Zr, La, Ce, Pr, Nd, Sm, Er and Yb.

10. The hydrogen absorbing alloy according to claim 8, wherein "M" in the general formula AM$_x$ represents at least one element selected from the group consisting of V, Nb, Cr, Mn, Fe, Co, Ni, Pd, Cu, Ag, Zn, B, Al, Ga, In, Si, Ge, Sn, P, Sb, and Bi.

11. The hydrogen absorbing alloy according to claim 8, wherein "x" in the general formula AM$_x$ meets the relationship 2.9$\leq$x$\leq$3.6.

12. The hydrogen absorbing alloy according to claim 8, wherein said average atomic radius r meets the relationship 1.37 Å$\leq$r$\leq$1.38 Å.

13. The hydrogen absorbing alloy according to claim 8, wherein "x" in the general formula AM$_x$ and said average atomic radius r meet the relationship 1.42$\leq$0.017x+r$\leq$1.44.

14. A method of manufacturing a hydrogen absorbing alloy, wherein an alloy represented by a general formula AM$_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of 2.7<x<3.8, an average atomic radius r meets the relationship 1.36 Å$\leq$r$\leq$1.39 Å, and said x and r meet the relationship 1.41$\leq$0.017x+r$\leq$1.45, is subjected to a heat treatment under vacuum or an inert gas atmosphere under temperatures not lower than 300° C. and lower than the melting point of said alloy.

15. The method of manufacturing a hydrogen absorbing alloy according to claim 14, wherein said heat treatment is performed at 800° C. to 1100° C.

16. A hydrogen absorbing alloy represented by a genera formula AM$_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of 2.7<x<3.8, an average atomic radius r (Å) and an equilibrium pressure Peq (atm) during the hydrogen absorption meet the relationships 1.36$\leq$r$\leq$1.39 and 0.1$\leq$Peq$\leq$3.5, respectively.

17. The hydrogen absorbing alloy according to claim 16, wherein "A" in the general formula AM$_x$ represents at least one element selected from the group consisting of Li, Mg, Ca, Sr, Sc, Y, Ti, Zr, La, Ce, Pr, Nd, Sm, Er and Yb.

18. The hydrogen absorbing alloy according to claim 16, wherein "M" in the general formula AM$_x$ represents at least one element selected from the group consisting of V, Nb, Cr, Mn, Fe, Co, Ni, Pd, Cu, Ag, Zn, B, Al, Ga, In, Si, Ge, Sn, P, Sb, and Bi.

19. The hydrogen absorbing alloy according to claim 16, wherein "x" in the general formula AM$_x$ meets the relationship 2.9$\leq$x$\leq$3.6.

20. The hydrogen absorbing alloy according to claim 16, wherein said average atomic radius r meets the relationship 1.37 Å$\leq$r$\leq$1.38 Å.

21. The hydrogen absorbing alloy according to claim 16, wherein said equilibrium pressure Peq meets the relationship 0.5$\leq$Peq$\leq$2.0.

22. A method of manufacturing a hydrogen absorbing alloy, wherein an alloy represented by a general formula AM$_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of 2.7<x<3.8, an average atomic radius r (Å) and an equilibrium pressure Peq (atm) during the hydrogen absorption meet the relationships $1.36 \leq r \leq 1.39$ and $0.1 \leq Peq \leq 3.5$, respectively, is subjected to a heat treatment under vacuum or an inert gas atmosphere and under temperatures not lower than 300° C. and lower than the melting point of the alloy.

23. The method of manufacturing a hydrogen absorbing alloy according to claim 22, wherein said heat treatment is performed at 800° C. to 1100° C.

24. An alkali secondary battery comprising a negative electrode containing a hydrogen absorbing alloy represented by a general formula $AM_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of $2.7<x<3.8$, and an average atomic radius r meets the relationship $1.36 \text{ Å} \leq r \leq 1.39 \text{ Å}$.

25. An alkali secondary battery comprising a negative electrode containing a hydrogen absorbing alloy represented by a general formula $AM_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of $2.7<x<3.8$, an average atomic radius r meets the relationship $1.36 \text{ Å} \leq r \leq 1.39 \text{ Å}$, and said x and said r meet the relationship $1.41 \leq 0.017x+r \leq 1.45$.

26. An alkali secondary battery comprising a negative electrode containing a hydrogen absorbing alloy represented by a general formula $AM_x$, where A is at least one element selected from IA group, IIA group, IIIB group, or IVB group of the periodic table, and M is at least one element selected from VB group, VIB group, VIIB group, VIIIB group, IB group, IIB group, IIIA group, IVA group or VA group of the periodic table, x meets the relationship of $2.7<x<3.8$, and an average atomic radius r (Å) and an equilibrium pressure Peq (atm) during the hydrogen absorption meet the relationships $1.36 \leq r \leq 1.39$ and $0.1 \leq Peq \leq 3.5$, respectively.

\* \* \* \* \*